United States Patent Office 3,166,159
Patented Jan. 19, 1965

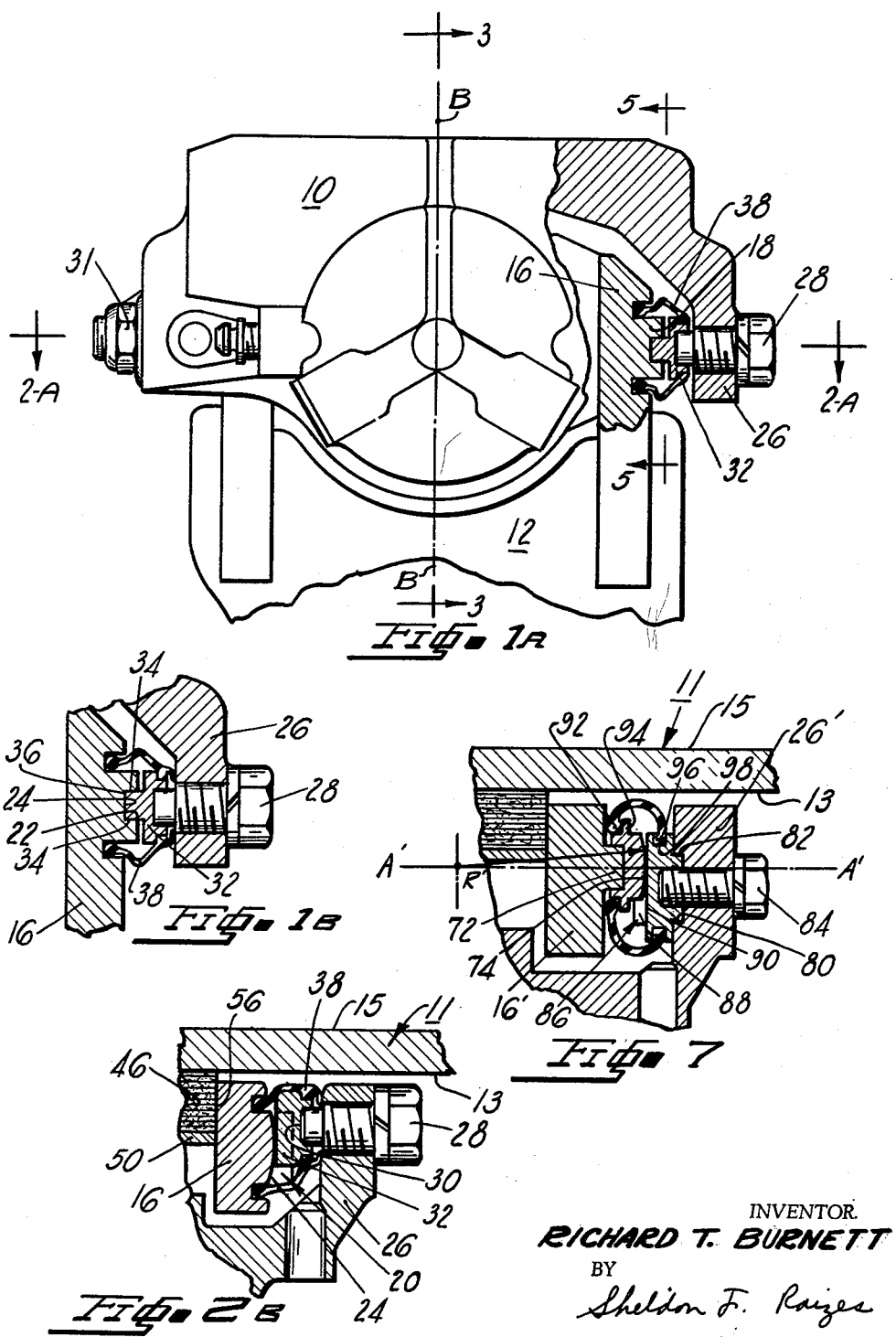

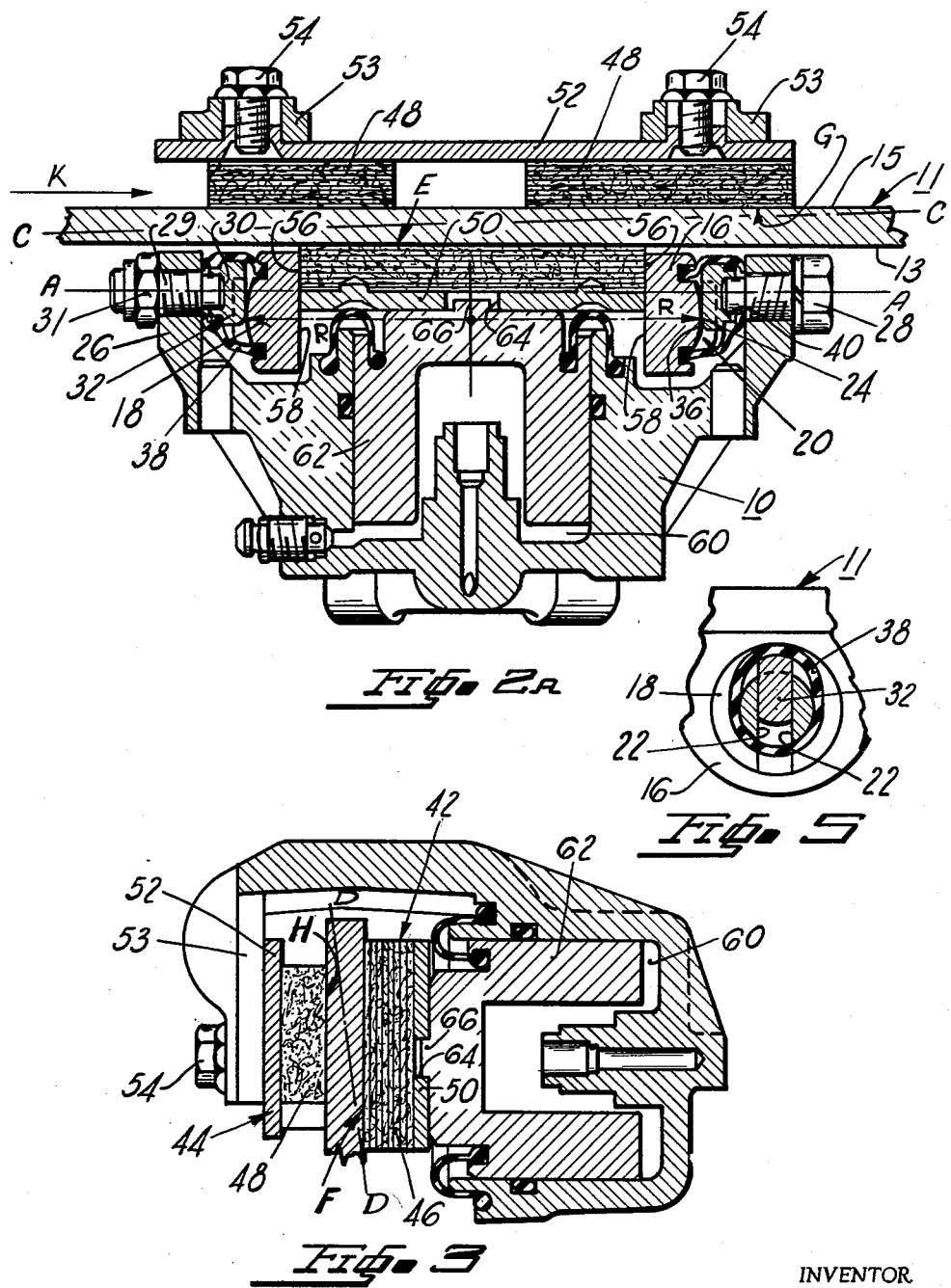

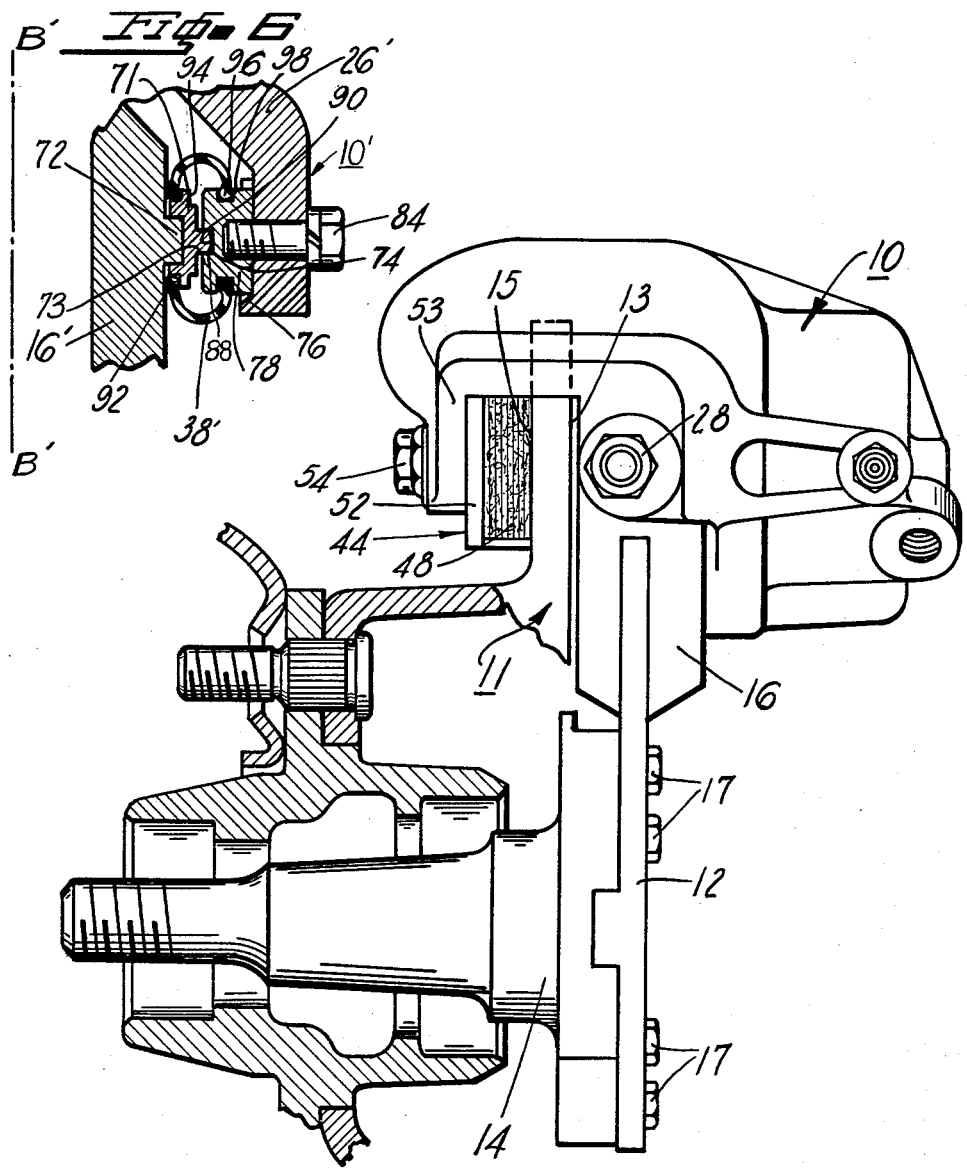

3,166,159
SPOT TYPE DISC BRAKE
Richard T. Burnett, South Bend, Ind., assignor to The Bendix Corporation, South Bend, Ind., a corporation of Delaware
Filed May 23, 1963, Ser. No. 282,794
4 Claims. (Cl. 188—73)

This invention relates to a disc brake and more particularly, to a brake of the caliper type wherein the caliper and the brake shoes of the brake are arranged on a support member in such a way that the friction members will fully engage the rotor of the brake.

One of the disadvantages of many disc brakes is that the brake shoes or friction members of the brake are not able to properly align themselves with the friction surface of the brake rotor resulting in uneven wear of the brake shoes, dragging of the brake shoes and a twisting strain on the caliper, the support, and the connection between the caliper and the support. To minimize to the extent possible the above disadvantages, tolerances must be carefully watched and the brake must be carefully aligned when mounted on the vehicle. This meticulousness results in added expense which is substantial when considered with the total cost.

One of the objects of the invention is to provide a disc brake which dispenses with many of the tolerances of manufacture which heretofore were necessary and which can be mounted to the vehicle with a decrease in many aligning problems previously encountered. Another object of this invention is to provide a brake which permits optimum alignment between friction members and a brake rotor.

Still another object of the invention is to provide a caliper disc brake wherein the caliper housing is pivotally mounted to its support about an axis generally parallel to the rotor faces and slidably mounted on its support for movement in a plane generally perpendicular to the rotor friction faces.

A further object of the invention is to provide a caliper disc brake wherein the housing is not only pivotally mounted to its support member for pivotal movement about an axis generally parallel to the plane of the rotor friction faces, but is also slidably and rockably mounted to the support member whereby the caliper housing can rock about an axis which is generally perpendicular to the pivoting axis and is generally parallel to the rotor friction faces.

Yet another object of the invention is to provide a disc brake containing the above features with a pair of friction members, one of which is carried by the housing and transfers braking torque through the housing to the support member and the other of which is slidable on the support member and which transfers braking torque directly to the support member.

An overall object of this invention is to provide a caliper brake which is simple in construction, economical to manufacture, including means for allowing full engagement of the brake shoe or friction members with the friction surface of the rotor and still maintain efficient braking.

A full understanding of the invention may be had from the following detailed description with reference to the accompanying drawings wherein:

FIG. 1A is an elevational front view of the caliper brake partially cut away to illustrate the feature of the invention;

FIG. 1B is an enlarged view in section of the cut-away section of FIG. 1A;

FIG. 2A is a view taken along section line 2A—2A of FIG. 1A;

FIG. 2B is an enlarged partial view of FIG. 2A;

FIG. 3 is a view taken along section line 3—3 of FIG. 1A;

FIG. 4 is a side elevational view of FIG. 1A;

FIG. 5 is a view taken along section line 5—5 of FIG. 1A;

FIG. 6 is a view similar to that of FIG. 1B only of a modified form of the invention; and FIG. 7 is a view similar to that of FIG. 2B only of the embodiment illustrated in FIG. 6.

Referring to FIGURES 1A–5, a caliper housing 10 is mounted on a support bracket 12 which is in turn mounted by bolts 17 to a stationary part of the vehicle which may be for example, a spindle 14. The caliper housing straddles a rotor 11 having friction faces 13 and 15 thereon. The support bracket has a pair of arms 16, which may be connected thereto by any suitable construction or be formed as an integral part thereof, projecting therefrom with each having a boss 18 on its outer face thereof. Each boss has a slot 20 having a pair of side faces 22 which extend toward the rotor friction surfaces in a plane generally perpendicular to the plane of the rotor friction faces. The closed end or bottom surface 24 of the slot 20 is convexly shaped and circumscribes an arc of a given radius R. The housing 10 has a pair of circumferentially spaced ears 26 embracing the arms 16 of the support member 12, one of which receives a threaded bolt 28 and the other of which receives a threaded bolt 29 therethrough. The inner ends 30 of the bolts 28 and 29 are smooth and form a bearing surface for a respective bearing member 32 which is rotatable thereon about an axis A—A. Each bearing member 32 is received within the slot 20 and has a pair of side edges 34 slidably engaging the side faces 22 of the slot 20 and an end surface 36 slidably and rockably engaging the closed end surface 24 of the slot 20. Thus, it can be seen, the housing and bearing members are rotatable or rockable as a unit about the bolts 28 and 29 and therefore axis A—A, and the housing is slidable in a direction generally perpendicular to the rotor friction faces relative to the support bracket 12. Due to the convexly shaped surface 24 the housing 10 can also rock about an axis B—B generally parallel to the rotor friction surfaces.

To mimize friction in pivotal movement between the bolts 28 and the bearing member 32 and in sliding between the bearing 32 and the slot 20 of the support bracket, it is desired that the connection between the housing and the support bracket be thoroughly lubricated at all times and be protected from contaminates. Therefore a boot 38 is attached to the boss 18 of a respective arm of the support member and is retained between a flange 40 on the bearing member 32 and the ear of the housing to encompass the bearing connection. The boot 38 will prevent loss of the lubricant and preclude contaminates from collecting in the connection.

To prevent rattling of the housing on the support member, the left bearing member 32 is axially adjustable along its axis of rotation to provide for a snug and yet loose enough fit for a slidable connection between the surfaces 24 and 36. Axial adjustment of the left bearing member 32 and thus the housing 10 relative to the arms 16 is effected by turning bolt 29 and tightening nut 31.

A pair of brake shoes 42 and 44 comprising brake linings 46, 48 and backing plates 50 and 52, respectively, are provided. The brake shoe 44 is rigidly attached to an arm 53 of the housing 10 by bolts 54. The other brake shoe 42 is disposed between the support member arms 16 with the circumferentially spaced ends 56 thereof slidably engaging the inner face 58 of each arm 16. A fluid chamber 60 is located at one side of the rotor and has a piston 62 slidable therein for engaging the shoe 42 with the rotor. The backing plate 50 has an opening 64 which receives a projection 66 of the piston 62 therein. The dimensions of the opening 64 and of the projection 66 are such that the brake shoe 42 may slide laterally or circumferentially during brake application relative to the piston but vertical movement thereof is prevented.

*Operation*

Upon actuation of the brake, the piston 62 will thrust brake shoe 42 against its respective rotor friction face 13 and then the hydraulic reaction will cause the housing 10 to move axially relative to the support 12, with the bearing member 32 and the housing sliding relative to the surfaces 22 and 24 of the support arms 16 thereby bringing the other brake shoe 44 into engagement with its respective rotor friction face 15. Assuming that the plane of the rotor is not perpendicular to its axis but is warped slightly and will tend to be in a plane designated by a line C—C (FIG. 2A) and line D—D (FIG. 3), then without applicant's construction the lining 46 would engage the rotor mainly in the vicinity of E and F and the lining 48 would engage the rotor only in the vicinity of G and H. Thus the linings will wear unevenly, utilization of the full lining surface in braking will not be achieved, and a twisting strain will be exerted by the rotor through the friction linings and backing plate to the housing 10 and its connection to the support plate 12. However, applicant's construction relieves the above since the housing can pivot and rock about axis A—A to align the housing and friction members vertically with the rotor friction faces and the housing can rock about the axis B—B to align the housing and friction members with the rotor friction faces horizontally thereby providing full engagement of the brake linings 46 and 48 with their respective rotor friction faces.

Assuming rotation of the rotor in the direction of arrow K, the right edge of the brake shoe 42 will anchor against the inner face 58 of the right arm 16 of the support bracket 12 while the anchoring load of the brake shoe 44 will be transmitted through the housing 10, and the left bearing member 32 to the left arm of the support bracket 12. Thus, by sliding the brake shoe 42 directly on the support arm 16, the torque of each brake shoe is distributed to a separate arm 16 of the support member 12.

Referring to a modified embodiment of FIG. 6, the elements similar to the construction of the prior embodiment are designated by like reference numerals with prime markings affixed thereto. A bearing member 71 rotatably fits over a boss 72 of each arm 16' and has a pair of parallel flat side surfaces 73 and a convexly shaped surface 74 circumscribing an arc of a given radius R'. The ears 26' have a slot 76 for receiving a bearing guide 78. The side surfaces 80 of the slot 76 and the edges 82 of the bearing guide member 78 coact to prevent pivoting movement of the guide 78. A bolt 84 holds the bearing guide 78 in position. The bearing guide has a slot 86 comprising flat side edge surfaces 88 and a flat bottom surface or closed end surface 90. The flat sides 73 of the bearing member 71 slidably engage surfaces 88 of the guide member 78 and the convexly shaped surface 74 of the bearing member slidably and rockably engages the bottom flat surface 90 of the guide member. Thus the housing 10', the guide member 78 and the bearing member 71 are rotatable relative to the support bracket arms 16'; and the housing 10' and the guide 78 are slidable and rockable as a unit relative to the bearing member 71 and the support bracket arms 16'.

A boot 38' encompasses the bearing member 71 and the boss 72 and has one annular end 92 confined between the support bracket arm 16' and a flange 94 of the bearing member 71 and its other annular end 96 confined within an annular groove 98 in the guide member.

The operation of the modified embodiment is the same as the previous embodiment with the housing 10' being pivotable about axis A'—A', which is stationary, pivotable about axis B'—B', and slidable in a plane substantially perpendicular to the plane of the rotor friction faces upon actuation of the brake.

It will be apparent that the objects heretofore enumerated as well as others have been achieved. While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In a disc brake comprising: a rotor having a pair of friction surfaces thereon, first friction means located opposite one of said rotor friction surfaces, a fixed support member comprising a pair of circumferentially spaced arms extending opposite said one rotor friction surface and embracing said first friction means, said arms providing at their inner edges guiding and anchoring surfaces for movement of said first friction means toward and away from said rotor and for anchoring of said first friction means thereon, a housing straddling said rotor and said first friction means, a second friction means opposite the other of said rotor friction surfaces, said housing carrying said second friction means for engagement with said other rotor friction surface, said housing having a pair of circumferentially spaced ends embracing said arms, the outer edge of each of said arms being located adjacent to and facing a respective one of said housing ends, a bearing member located between each of said housing ends and their respective arms, each said bearing member being rotatably mounted on a respective one of said arms about an axis generally parallel to the plane of said rotor friction surfaces, a slot located on each of said housing ends and facing their respective arms, the side faces of said slots extending toward said one rotor friction surface, each said bearing member having flat side surfaces engaging the side faces of said slots thereby providing a slidable connection between said flat surfaces of said bearing members and said side faces of said slots of said housing for movement in a direction generally perpendicular to the plane of said rotor friction surfaces and providing a rotatable connection of said housing and bearing members relative to said support member, each of said slots having a closed end surface, each of said bearing members having an end surface transverse to said side surfaces for engaging said closed end surface of said slot, each of said end surfaces on said bearing members and the closed end surface of their respective slots being so spaced that when one set of end surfaces are in engagement with each other there is a clearance between the other set of end surfaces, and actuating means carried by said housing and engaging said one friction member for sliding the same into engagement with said one rotor friction surface whereby upon engagement of said one friction member with said rotor said housing will slide to bring said second friction member into engagement with said other friction surface.

2. The structure as recited in claim 1 wherein said end surfaces of said bearing members are convexly shaped and said closed end surfaces of said slots are generally flat, whereby said housing can rock on said support member about an axis generally parallel to the plane of said rotor friction surfaces and generally perpendicular to said first mentioned axis.

3. In a disc brake comprising: a rotor having a pair of friction surfaces thereon, first friction means located opposite one of said rotor friction surfaces, a fixed support member comprising a pair of circumferentially spaced arms extending opposite said one rotor friction surface and embracing said first friction means, said arms providing at their inner edges guiding and anchoring surfaces for movement of said first friction means toward and away from said rotor and for anchoring of said first friction means thereon, a housing straddling said rotor and said first friction means, a second friction means opposite the other of said rotor friction surfaces, said housing carrying said second friction means for engagement with said other rotor friction surface, said housing having a pair of circumferentially spaced ends embracing said arms, the outer edge of each of said arms being located adjacent to and facing a respective one of said housing ends, a bearing member located between each of said housing ends and their respective arms, each said bearing member being rotatably mounted on a respective one of said housing ends about an axis generally parallel to the plane of said rotor friction surfaces, a slot located on the outer edge of each of said arms and facing their respective bearing member, the side faces of said slots extending toward said one rotor friction surface, each said bearing member having flat side surfaces engaging the side faces of said slots thereby providing a slidable connection between said flat surfaces of said bearing members and said side faces of said slots for movement of said housing in a direction generally perpendicular to the plane of said rotor friction surfaces and providing a rotatable connection of said housing relative to said bearing members and said support member, each of said slots having a closed end surface, each of said bearing members having an end surface transverse to said side surfaces for engaging said closed end surface of said slot, each of said end surfaces on said bearing members and the closed end surface of their respective slots being so spaced that when one set of said end surfaces are in engagement with each other there is a clearance between the other set of end surfaces, and actuating means carried by said housing and engaging said one friction member for sliding the same into engagement with said one rotor friction surface whereby upon engagement of said one friction member with said rotor said housing will slide to bring said second friction member into engagement with said other friction surface.

4. The structure as recited in claim 3 wherein said end surfaces of said bearing members are generally flat and said closed end surfaces of said slots are convexly shaped, whereby said housing can rock on said support member about an axis generally parallel to the plane of said rotor friction surfaces and generally perpendicular to said first mentioned axis.

References Cited by the Examiner
UNITED STATES PATENTS

| | | | |
|---|---|---|---|
| 2,820,530 | 1/58 | Chouings et al. | 188—73 |
| 2,966,964 | 1/61 | Brueder | 188—73 |
| 3,047,098 | 7/62 | Olley | 188—73 |
| 3,095,949 | 7/63 | Butler | 188—73 |

FOREIGN PATENTS 1,267,299  6/61  France.

EUGENE G. BOTZ, *Primary Examiner.*
ARTHUR L. LA POINT, *Examiner.*